United States Patent
Yoshida (10) Patent No.: US 10,118,378 B2
(45) Date of Patent: Nov. 6, 2018

(54) CROSS-SECTION DATA GENERATING DEVICE AND CROSS-SECTION DATA GENERATING METHOD

(71) Applicant: Roland DG Corporation, Hamamatsu-shi, Shizuoka (JP)

(72) Inventor: Makoto Yoshida, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 67 days.

(21) Appl. No.: 15/355,127

(22) Filed: Nov. 18, 2016

(65) Prior Publication Data

US 2017/0148182 A1    May 25, 2017

(30) Foreign Application Priority Data

Nov. 20, 2015    (JP) ................. 2015-227306

(51) Int. Cl.
| | |
|---|---|
| *B33Y 50/00* | (2015.01) |
| *G06T 7/40* | (2017.01) |
| *G06T 7/00* | (2017.01) |
| *G06T 17/20* | (2006.01) |
| *G06T 15/04* | (2011.01) |

(52) U.S. Cl.
CPC ............ *B33Y 50/00* (2014.12); *G06T 7/0051* (2013.01); *G06T 7/0085* (2013.01); *G06T 7/408* (2013.01); *G06T 15/04* (2013.01); *G06T 17/205* (2013.01); *G06T 2200/04* (2013.01); *G06T 2207/10024* (2013.01)

(58) Field of Classification Search
None
See application file for complete search history.

(56) References Cited

U.S. PATENT DOCUMENTS

2015/0029187 A1    1/2015  Nakamura

FOREIGN PATENT DOCUMENTS

| JP | 2002-292748 A | 10/2002 |
|---|---|---|
| JP | 3380429 B2 | 2/2003 |
| JP | 3520200 B2 | 4/2004 |
| JP | 2015-024631 A | 2/2015 |

*Primary Examiner* — Michelle Chin
(74) *Attorney, Agent, or Firm* — Keating & Bennett, LLP (57) ABSTRACT

A cross-section data generating device includes a storage that stores therein a three-dimensional polygon model provided with color information, and a processor that executes a program to perform a shape obtaining process of obtaining a shape of an outline of the three-dimensional polygon model at a cross section that intersects the three-dimensional polygon model, and a color information obtaining process of obtaining color information of the outline at the cross section.

18 Claims, 9 Drawing Sheets

| Vertex identifier | Coordinate value | Color information |
|---|---|---|
| V1 | (X1, Y1, Z1) | (Rv1, Gv1, Bv1) |
| V2 | (X2, Y2, Z2) | (Rv2, Gv2, Bv2) |
| V3 | (X3, Y3, Z3) | (Rv3, Gv3, Bv3) |
| ⋮ | ⋮ | ⋮ |

FIG.4

| Edge identifier | Vertex identifier of start point | Vertex identifier of end point | Color information |
|---|---|---|---|
| E1 | V1 | V2 | (Re1, Ge1, Be1) |
| E2 | V2 | V3 | (Re2, Ge2, Be2) |
| E3 | V3 | V1 | (Re3, Ge3, Be3) |
| ⋮ | ⋮ | ⋮ | ⋮ |

FIG.5

| Polygon identifier | First vertex identifier | Second vertex identifier | Third vertex identifier | Color information |
|---|---|---|---|---|
| P1 | V1 | V2 | V3 | (Rp1, Gp1, Bp1) |
| P2 | V1 | V2 | V4 | (Rp2, Gp2, Bp2) |
| P3 | V2 | V3 | V5 | (Rp3, Gp3, Bp3) |
| ⋮ | ⋮ | ⋮ | ⋮ | ⋮ |

| Point-of-intersection identifier | Coordinate value | Edge identifier | Color information |
|---|---|---|---|
| Ia1 | (Xia1, Yia1) | E121 | (Re121, Ge121, Be121) |
| Ia2 | (Xia2, Yia2) | E122 | (Re122, Ge122, Be122) |
| Ia3 | (Xia3, Yia3) | E123 | (Re123, Ge123, Be123) |
| ⋮ | ⋮ | ⋮ | ⋮ |

*FIG.9*

| Line-of-intersection identifier | First point-of-intersection identifier | Second point-of-intersection identifier | Polygon identifier | Color information |
|---|---|---|---|---|
| La1 | Ia1 | Ia2 | P71 | (Rp71, Gp71, Bp71) |
| La2 | Ia2 | Ia3 | P72 | (Rp72, Gp72, Bp72) |
| La3 | Ia3 | Ia4 | P73 | (Rp73, Gp73, Bp73) |
| ⋮ | ⋮ | ⋮ | ⋮ | ⋮ |

| Post-offset point-of-intersection identifier | Coordinate value | Pre-offset point-of-intersection identifier | Color information |
|---|---|---|---|
| Ib1 | (Xib1, Yib1) | Ia1 | (Re121, Ge121, Be121) |
| Ib2 | (Xib2, Yib2) | Ia2 | (Re122, Ge122, Be122) |
| Ib3 | (Xib3, Yib3) | Ia3 | (Re123, Ge123, Be123) |
| ⋮ | ⋮ | ⋮ | ⋮ |

FIG.12

| Post-offset line-of-intersection identifier | First post-offset point-of-intersection identifier | Second post-offset point-of-intersection identifier | Pre-offset line-of-intersection identifier | Color information |
|---|---|---|---|---|
| Lb1 | Ib1 | Ib2 | La1 | (Rp71, Gp71, Bp71) |
| Lb2 | Ib2 | Ib3 | La2 | (Rp72, Gp72, Bp72) |
| Lb3 | Ib3 | Ib4 | La3 | (Rp73, Gp73, Bp73) |
| ⋮ | ⋮ | ⋮ | ⋮ | ⋮ |

| Rectangular element identifier | Pre-offset line-of-intersection identifier | Post-offset line-of-intersection identifier | Color information |
|---|---|---|---|
| S1 | La1 | Lb1 | (Rp71, Gp71, Bp71) |
| S2 | La2 | Lb2 | (Rp72, Gp72, Bp72) |
| S3 | La3 | Lb4 | (Rp73, Gp73, Bp73) |
| ⋮ | ⋮ | ⋮ | ⋮ |

FIG.15

| Rectangular element identifier | First post-offset point-of-intersection identifier | Second post-offset point-of-intersection identifier | First pre-offset point-of-intersection identifier | Second pre-offset point-of-intersection identifier |
|---|---|---|---|---|
| S1 | Ib1 | Ib2 | Ia1 | Ia2 |
| S2 | Ib2 | Ib3 | Ia2 | Ia3 |
| S3 | Ib3 | Ib4 | Ia3 | Ia4 |
| ⋮ | ⋮ | ⋮ | ⋮ | ⋮ |

CROSS-SECTION DATA GENERATING DEVICE AND CROSS-SECTION DATA GENERATING METHOD

CROSS REFERENCE TO RELATED APPLICATIONS

This application claims the benefit of priority to Japanese Patent Application No. 2015-227306 filed on Nov. 20, 2015. The entire contents of this application are hereby incorporated herein by reference.

BACKGROUND OF THE INVENTION

1. Field of the Invention

The present invention relates to a cross-section data generating device, and a cross-section data generating method and program.

2. Description of the Related Art

Japanese Laid-Open Patent Publication No. 2002-292748 discloses a three-dimensional printing device for printing colored three-dimensional printed objects. Specifically, this three-dimensional printing device applies a binder partially to a powder layer and then applies a colorant thereto, thus producing a colored slice object, and repeats the binder application and the colorant application, thus printing a three-dimensional printed object, which includes slice objects stacked together.

Japanese Laid-Open Patent Publication No. 2015-24631 discloses a technique in which an outline of a cross section of a polygon mesh model of a three-dimensional printed object is obtained and the outline is modified to generate slice data based on the modified outline.

Japanese Patent No. 3380429 and Japanese Patent No. 3520200 each disclose a technique for offsetting the contour shape.

SUMMARY OF THE INVENTION

A cross-section data generating device according to a preferred embodiment of the present invention includes a storage that stores a three-dimensional polygon model provided with color information, a shape obtaining processor configured or programmed to obtain a shape of an outline of the three-dimensional polygon model at a cross section, which is a plane that intersects the three-dimensional polygon model, and a color information obtaining processor configured or programmed to obtain color information of the outline at the cross section. In this preferred embodiment, it is possible to generate slice object data having color information of the surface of a three-dimensional printed object based on the shape and color information of the outline of the three-dimensional polygon model.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Now, for the application of a pattern or a color onto the surface of a three-dimensional printed object, the present inventor has discovered the following.

For example, a planar color image may be prepared in advance, and a colorant may be transferred in a projective manner onto the surface of a three-dimensional printed object so as to transfer the color image onto the surface of the three-dimensional printed object. In this case, however, the colorant cannot be transferred normally onto portions of the surface of the three-dimensional printed object that are steeply inclined with respect to the plane orthogonal to the color image projecting direction.

Alternatively, a color image of raster format may be prepared in advance for each layer, and these color images may be successively output to a three-dimensional printing device so as to produce a plurality of slice objects, to be stacked together, from these color images. In this case, however, it is necessary to prepare in advance a large number of color images in raster format. The preparation requires a very large amount of work, and the amount of data of these color images will become very large.

Alternatively, a three-dimensional model is prepared in advance for each primary color. Next, a single-color image of raster format of a cross section of a three-dimensional model is generated for each three-dimensional cross-section model. Then, based on these single-color images, single-color slice objects of different primary colors are produced as one layer. This results in a single layer of a color slice object that includes the single-color slice objects of different primary colors combined together. In a three-dimensional printing process, the color slice objects are successively produced and stacked together, thus printing a color three-dimensional printed object. In this case, however, a three-dimensional model needs to be prepared in advance for each primary color, and the preparation requires a very large amount of work.

Three-dimensional models include three-dimensional polygon models that use "polygons". The present inventor has conceived of an idea of utilizing a three-dimensional polygon model to generate color slice object data along a cross section that intersects the three-dimensional polygon model.

According to a preferred embodiment of the present invention, a cross-section data generating device includes a storage, a shape obtaining processor, and a color information obtaining processor.

The storage stores a three-dimensional polygon model provided with color information. The shape obtaining processor is configured or programmed to obtain a shape of an outline of the three-dimensional polygon model at across section, which is a plane that intersects the three-dimensional polygon model. The color information obtaining processor is configured or programmed to obtain color information of the outline at the cross section. In this case, it is possible to generate color image data that renders the outline of the three-dimensional polygon model at the cross section based on the shape of the outline obtained by the shape obtaining processor and the color information of the outline obtained by the color information obtaining processor. The slice object data obtained from the generated image data includes the color information of the surface of the three-dimensional printed object.

For example, the storage may store therein the three-dimensional polygon model, wherein each edge and each polygon of the three-dimensional polygon model are associated with color information. For example, the storage may store the information so that identifiers each identifying a point, an edge or a triangle polygon of the three-dimensional polygon model are each associated with color information. In this case, an example may be a storage of a matrix structure that stores identifiers which identify a point, an edge and a triangle polygon, and corresponding color information for each.

In this case, the shape obtaining processor specifies a point of intersection between the cross section and each edge of the edges of the three-dimensional polygon model that intersects the cross section. The shape obtaining processor further specifies a line of intersection between the cross section and each polygon of the polygons of the three-dimensional polygon model that intersects the cross section. Then, the shape obtaining processor obtains the shape of the outline which includes the points of intersection and the lines of intersection.

The color information obtaining processor passes color information of each edge that intersects at a point of intersection on to the point of intersection. The color information obtaining processor further passes color information of each polygon that intersects a line of intersection on to the line of intersection. Then, the color information obtaining processor obtains color information of the outline.

Thus, color image data that renders the outline of the three-dimensional polygon model at the cross section is generated.

Herein, passing on color information can also be referred to as a process of recording or copying color information. For example, in the process of passing the color information of an edge that intersects at a point of intersection on to the point of intersection, the color information of the edge that intersects at the point of intersection is recorded as the color information of the point of intersection. In the process of passing color information of a polygon that intersects at a line of intersection on to the line of intersection, the color information of the polygon that intersects at the line of intersection is recorded as the color information of the line of intersection.

In another preferred embodiment, the cross-section data generating device may further include an image generating processor.

Herein, the image generating processor is configured or programmed to generate, in accordance with the shape obtained by the shape obtaining processor and the color information obtained by the color information obtaining processor, color cross-section image data which is image data of the outline that can be represented by the shape and the color information. The color cross-section image data of the outline of the three-dimensional polygon model at the cross section may be thus generated by the image generating processor.

Moreover, the image generating processor may generate the color cross-section image data of the outline of the three-dimensional polygon model at the cross section in raster format.

In another preferred embodiment of the present invention, the cross-section data generating device may further include an offsetting processor and a color information passing processor.

The offsetting processor is configured or programmed to offset the shape obtained by the shape obtaining processor toward the inside of the three-dimensional polygon model.

The color information passing processor is configured or programmed to pass the color information obtained by the color information obtaining processor on to the offset shape which is derived by the offsetting processor.

Herein, for example, the post-offset outline shape is obtained by shifting the outline shape of the pre-offset three-dimensional polygon model obtained by the shape obtaining processor toward the inside of the outline shape of the pre-offset three-dimensional polygon model. In some cases, a three-dimensional polygon model has two outlines, i.e., an inner outline and an outer outline. In such a case, the two outlines, i.e., the inner outline and the outer outline, are each shifted toward the inside of the outline shape of the pre-offset three-dimensional polygon model. That is, the post-offset inner outline is slightly larger than the pre-offset inner outline. On the other hand, the post-offset outer outline is slightly smaller than the pre-offset outer outline. Thus, the post-offset inner outline and the post-offset outer outline are positioned on the inside of the shape of the original three-dimensional polygon model.

In the process of passing the color information obtained by the color information obtaining processor on to the offset shape which is derived by the offsetting processor, the color information obtained by the color information obtaining processor is recorded as the color information of the offset shape which is derived by the offsetting processor.

In such a case, the cross-section data generating device may include an image generating processor.

The image generating processor is configured or programmed to generate, in accordance with the offset shape which is derived by the offsetting processor and the color information which has been passed on by the color information passing processor, color cross-section image data which is image data of a post-offset outline represented by the shape and the color information.

In this preferred embodiment, the color cross-section image data of the outline obtained by offsetting the outline of the three-dimensional polygon model at the cross section is generated.

Moreover, the image generating processor may generate the color cross-section image data of the post-offset outline in raster format.

In another preferred embodiment, the cross-section data generating device may include an offsetting processor, a slice model generating processor and a color information passing processor.

The offsetting processor is configured or programmed to offset the shape obtained by the shape obtaining processor toward the inside of the three-dimensional polygon model.

The slice model generating processor is configured or programmed to generate a slice model by meshing a gap between the shape obtained by the shape obtaining processor and the offset shape obtained by the offsetting processor.

The color information passing processor is configured or programmed to pass the color information obtained by the color information obtaining processor on to the slice model generated by the slice model generating processor. In other words, the color information obtained by the color information obtaining processor is recorded as the color information of the slice model generated by the slice model generating processor.

In such a case, the cross-section data generating device may include an image generating processor. The image generating processor is configured or programmed to generate, in accordance with the slice model generated by the slice model generating processor and the color information passed on by the color information passing processor, color cross-section image data which is image data of the slice model including the color information.

In this preferred embodiment, color cross-section image data that is obtained by thickening the outline of the three-dimensional polygon model at the cross section is generated.

Moreover, the image generating processor may generate the color cross-section image data of the slice model in raster format.

In another preferred embodiment of the present invention, the cross-section data generating device may further include an output that outputs the color cross-section image data generated by the image generating processor to a three-dimensional printing device.

In this preferred embodiment, slice objects based on the color cross-section image data are able to be generated by the three-dimensional printing device.

In another preferred embodiment, the cross section data generating processor including the image generating processor may include an output. The output outputs predetermined thickness information together with the color cross-section image data generated by the image generating processor to the three-dimensional printing device.

In this preferred embodiment, slice objects are successively stacked on one another by the three-dimensional printing device, thus printing a three-dimensional printed object. The predetermined thickness information represents the thickness of one layer of the slice object.

Thus, the thickness of one layer of the slice object generated by the three-dimensional printing device is able to be controlled by the cross-section data generating device.

Moreover, the image generating processor may generate the color cross-section image data of the slice model in raster format. As the color cross-section image data of the slice model is generated in raster format, a slice object generated by the three-dimensional printing device is able to be desirably joined with another adjacent slice object to be stacked thereon. In raster format, the color cross-section image data is generated pixel by pixel. Therefore, in the three-dimensional printing process, the color information is set pixel by pixel, and it is therefore possible to control the color pixel by pixel. Thus, color cross-section image data generated in raster format gains a better ability to represent an expressive power over three-dimensional printed object than that in vector format. For example, a three-dimensional printed object will have a better color overlap between colors and between layers, and it is possible to realize a higher ability of expression in terms of gradation and anti-aliasing. The difference in the ability of expression as compared with vector format is more prominent as the resolution is higher. For example, with three-dimensional printing based on a powder binding method, particularly an inkjet powder deposition method, the resolution is higher and a higher ability of expression is able to be realized as the powder size is smaller. Moreover, with raster format, adjacent layers of slice objects are able to be desirably joined together even when the printing resolution (dpi) of the three-dimensional printing device 1 is high. In this preferred embodiment, when color cross-section image data of a slice model is obtained, the data is generated layer by layer in raster format. In such a case, data computation may be done in vector format before color cross-section image data of a slice model is obtained. For example, by doing the data computation in vector format before color cross-section image data of a slice model is obtained, it is possible to reduce the computational load for generating color cross-section image data of a slice model in raster format.

Herein, the cross section data generating device may be embodied by a computer or other processor or processors executing processes defined by a program, for example. For example, the computer preferably includes an interface (I/F) receiving data from an external device such as a host computer, a central processing unit (CPU) executing instructions of the program, a ROM storing the program to be executed by the CPU, a RAM used as a working area for the execution of the program, and a storage device (recording medium) such as a memory storing the program and various data.

That is, the storage, the shape obtaining processor, the color information obtaining processor, the image generating processor, the offsetting processor, the color information passing processor, the slice model generating processor, the output, etc., which have been listed as components of the cross-section data generating device, are embodied by a computer or a single process or multiple processors. That is, processes to be executed by the storage, the shape obtaining processor, the color information obtaining processor, the image generating processor, the offsetting processor, the color information passing processor, the slice model generating processor, the output, etc., may each be embodied as a process to be executed by a computer or processor or multiple processors operating based on a predetermined program or programs. In such a case, the cross-section data generating device may be realized by one or more computers or processors. A plurality of computers or processors may operate in cooperation with each other via a computer network to execute a single process.

One preferred embodiment of a cross section data generating method proposed herein includes a shape obtaining step and a color information obtaining step.

The shape obtaining step is a step of obtaining a shape of an outline of a three-dimensional polygon model provided with color information and stored in a storage at a cross section which is a plane that intersects the three-dimensional polygon model.

The color information obtaining step is a step of obtaining color information of the outline at the cross section.

In this preferred embodiment, it is possible to generate color cross-section image data that renders the outline of the three-dimensional polygon model at the cross section, based on the shape of the outline obtained in the shape obtaining step and the color information of the outline obtained in the color information obtaining step.

According to a preferred embodiment of the present invention, a non-transitory computer readable medium stores a program that is executed by a computer to perform a shape obtaining process and a color information obtaining process as follows.

Herein, the computer or processor(s) is preferably capable of reading a storage storing therein a three-dimensional polygon model provided with color information.

The shape obtaining process is a process of obtaining a shape of an outline of the three-dimensional polygon model at a cross section which is a plane that intersects the three-dimensional polygon model.

The color information obtaining process is a process of obtaining color information of the outline at the cross section.

In this preferred embodiment, it is possible to generate color cross-section image data that renders the outline of the three-dimensional polygon model at the cross section based on the shape of the outline obtained in the shape obtaining process and the color information of the outline obtained in the color information obtaining process.

Herein, the non-transitory computer readable medium may be, for example, a magnetic recording medium (e.g., a flexible disk, magnetic tape or a hard disk drive), a CD-ROM (Read Only Memory), etc.

Preferred embodiments of the present invention will now be further described with reference to the drawings. Note however that the following preferred embodiments are merely examples. The present invention is not limited to the following preferred embodiments or the examples illustrated in the drawings, unless otherwise specified.

Figure 1:
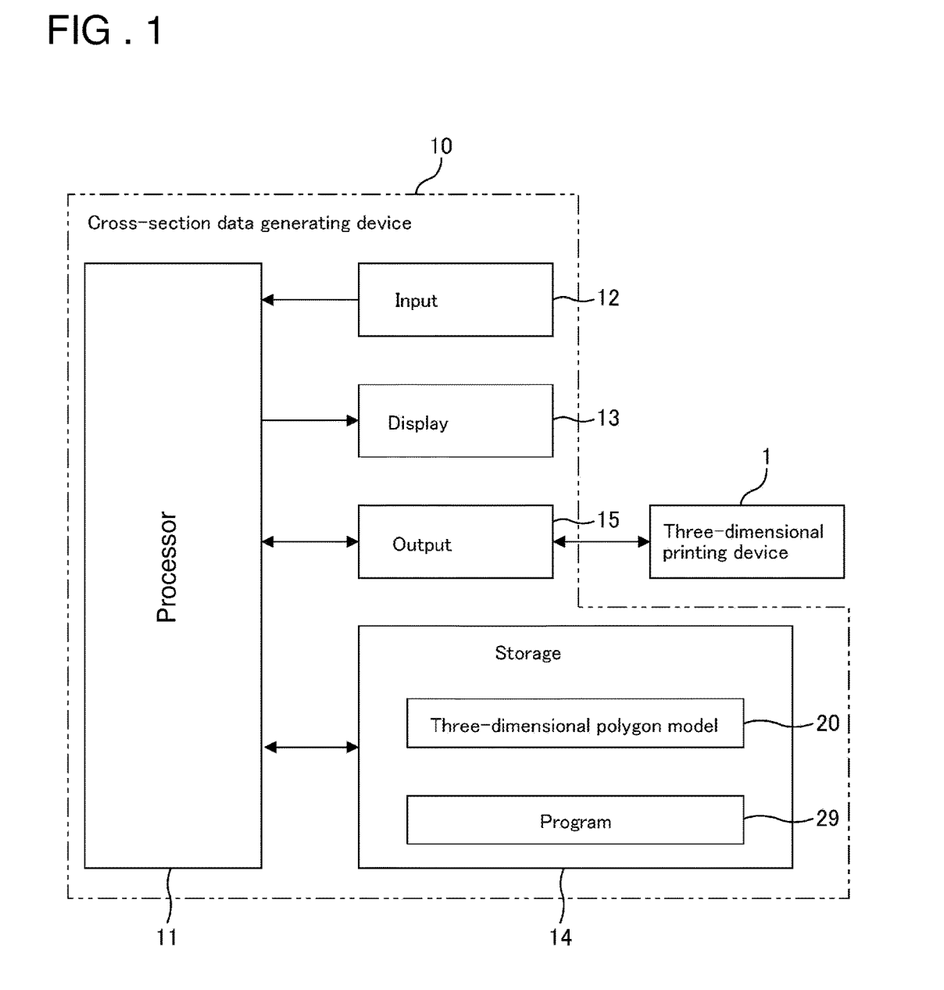
FIG. 1 is a block diagram of a cross-section data generating device.

FIG. 1 is a block diagram showing a cross-section data generating device 10 together with a three-dimensional printing device 1. The cross-section data generating device 10 is a device that successively generates a plurality of pieces of color cross-section image data in raster representation, and successively output these pieces of color cross-section image data to the three-dimensional printing device 1. The three-dimensional printing device 1 is a so-called "3D printer". Thus, the three-dimensional printing device 1 is a device that receives each piece of color cross-section image data from the cross-section data generating device 10 to produce (i.e., print) a slice object (i.e., a solid object that is obtained by adding a predetermined thickness to color cross-section image data) in accordance with the piece of color cross-section image data and stack the slice object on another, thus printing a three-dimensional printed object, which includes these slice objects stacked together. The three-dimensional printing device 1 is a modeling device based on, for example, a digital light processing method, a fused deposition modeling method (FDM), a powder binding method or an inkjet method (i.e., droplet discharge method). The color cross-section image data generated by the cross-section data generating device 10 is color image data, and slice objects generated by the three-dimensional printing device 1 are provided with a color, a pattern, etc., applied thereon. Therefore, a three-dimensional printed object produced by the three-dimensional printing device 1 is colored. In the following description, the color space of cross-section image data generated by the cross-section data generating device 10 is an RGB color space, a CMY color space, an HSV color space or an HLS color space, for example.

The cross-section data generating device 10 preferably is a desktop, notebook or tablet computer system with a program installed thereon, for example. The cross-section data generating device 10 includes a processor 11, an input 12, a display 13, a storage 14, an output 15, etc. The processor 11 preferably is a computer including a CPU, a GPU, a ROM, a RAM, a hardware interface, etc. The input 12 is an input device such as a switch, a keyboard, a pointing device or the like. The display 13 is a display device that displays images on the screen. The storage 14 is a storage device, e.g., a semiconductor memory or a hard disk drive. The output 15 is a hardware interface (e.g., an interface of the universal serial bus standard) that exchanges data with the three-dimensional printing device 1 in response to instructions from the processor 11.

Herein, the cross-section data generating device 10 includes the storage 14 and the processor 11 configured or programmed to store a three-dimensional polygon model 20 provided with color information. Based on the program 29, the processor 11 executes, for example, a shape obtaining process of obtaining the shape of an outline 34 of the three-dimensional polygon model 20 along a cross section 50 that intersects the three-dimensional polygon model 20 to be described below, a color information obtaining process of obtaining color information of the outline 34 along the cross section 50, etc.

The storage 14 stores at least a three-dimensional polygon model provided with color information. In this preferred embodiment, the storage 14 stores therein the three-dimensional polygon model 20 obtained by modeling a three-dimensional printed object in a virtual three-dimensional space. Note that the three-dimensional polygon model 20 may be a model that is downloaded to the storage 14 from another computer or processor, or a model that is once transferred from another computer or processor to a portable storage medium and then transferred from the portable storage medium to the storage 14.

Figure 2:
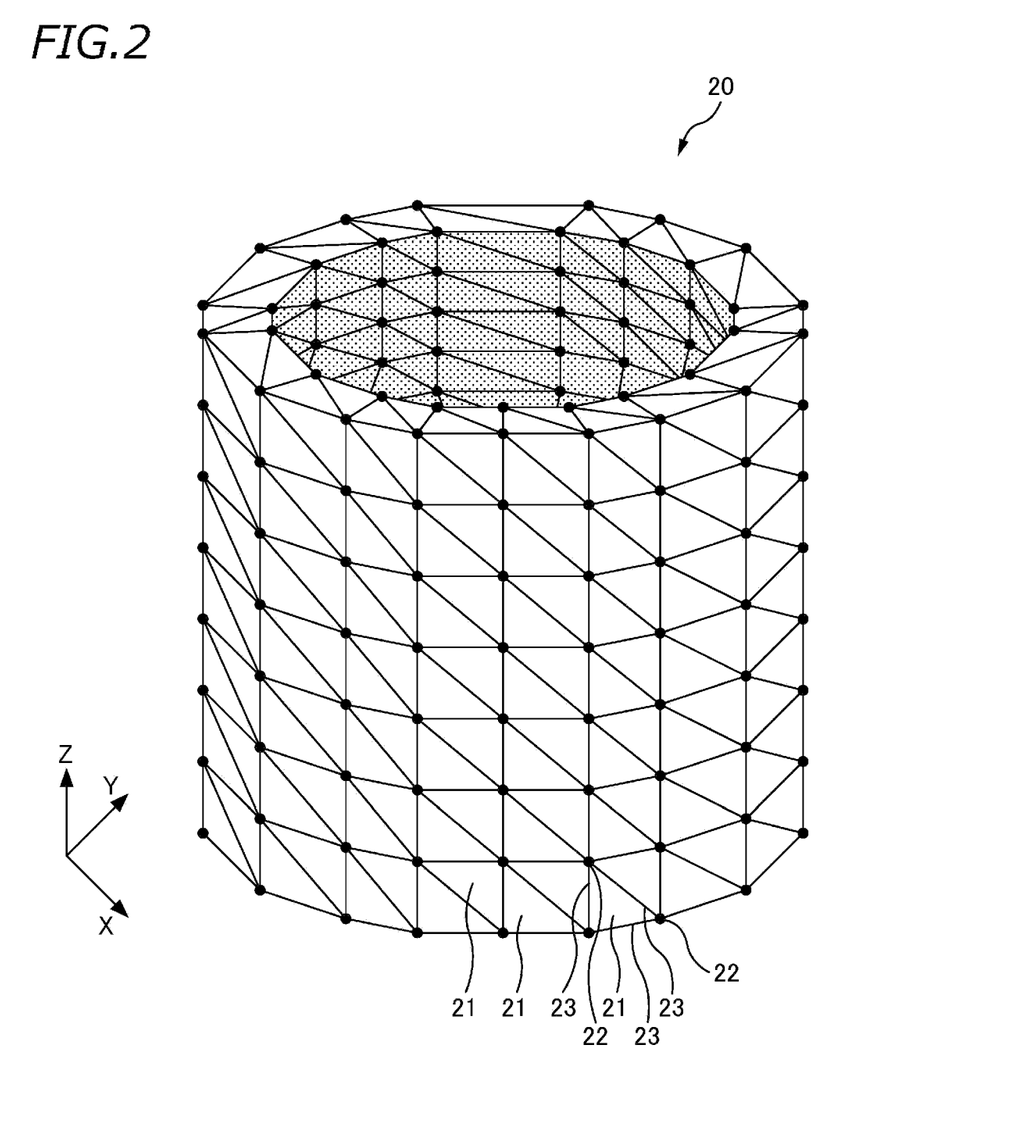
FIG. 2 is a view showing a three-dimensional polygon model, which is modeled in a virtual three-dimensional space.

FIG. 2 is a schematic view of the three-dimensional polygon model 20 modeled in a virtual three-dimensional space. As shown in FIG. 2, the three-dimensional polygon model 20 includes a plurality of triangle polygons 21 arranged along the surface of the three-dimensional polygon model 20. Each triangle polygon 21 includes three vertices 22 and three edges 23 connecting between these vertices 22. The virtual three-dimensional space, in which the three-dimensional polygon model 20 is modeled, is represented by a rectangular coordinate system including the X axis, the Y axis and the Z axis, and the position of each vertex 22 is represented by XYZ coordinates, thus defining the three-dimensional polygon model 20, the triangle polygons 21 and the edges 23 in the virtual three-dimensional space.

Figure 3:
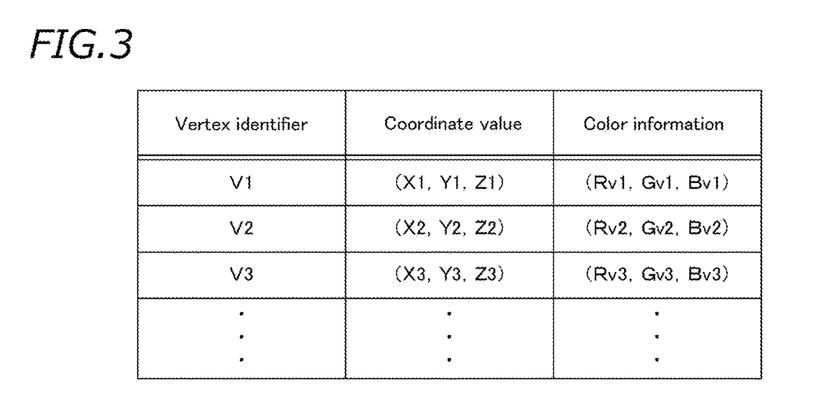
FIG. 3 is a view showing a data structure of vertices of the three-dimensional polygon model.
Figure 4:
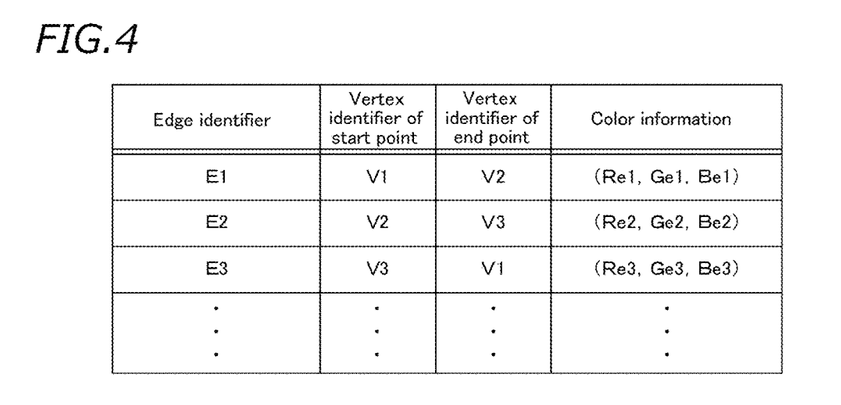
FIG. 4 is a view showing a data structure of edges of the three-dimensional polygon model.
Figure 5:
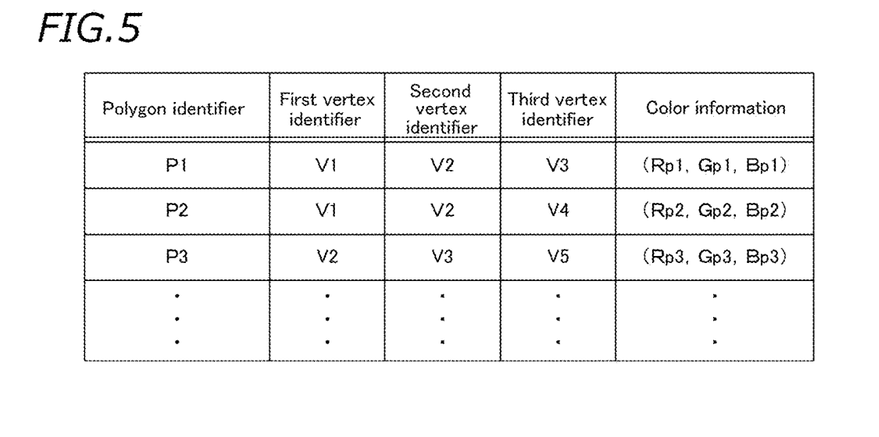
FIG. 5 is a view showing a data structure of triangle polygons of the three-dimensional polygon model.

FIG. 3 to FIG. 5 are views each schematically showing the data structure of the three-dimensional polygon model 20. FIG. is a data structure diagram of the vertices 22 of the three-dimensional polygon model 20. FIG. 4 is a data structure diagram of the edges 23 of the three-dimensional polygon model 20. FIG. 5 is a data structure diagram of the triangle polygons 21 of the three-dimensional polygon model 20.

As shown in FIG. 3, data of each vertex 22 of the three-dimensional polygon model 20 includes a vertex identifier, a coordinate value and color information, which are associated together. The vertex identifier is unique data to identify the vertex 22. The coordinate value is data representing a position of the vertex 22 in the virtual three-dimensional space. The color information is data representing the color of the vertex 22.

As shown in FIG. 4, data of each edge 23 of the three-dimensional polygon model 20 includes an edge identifier, a start-point vertex identifier and an end-point vertex identifier, which are associated together. The edge identifier is unique data to identify the edge 23. The start-point vertex identifier is an identifier to specify a vertex 22 that corresponds to the start point, which is one end of the edge 23. The end-point vertex identifier is an identifier to specify a vertex 22 that corresponds to the end point, which is the other end of the edge 23.

As shown in FIG. 5, data of each triangle polygon 21 of the three-dimensional polygon model 20 includes a polygon identifier, three vertex identifiers and color information, which are associated together. The polygon identifier is unique data to identify the triangle polygon 21. The first to third vertex identifiers are identifiers to specify the first to third vertices 22 of the triangle polygon 21.

Based on the data shown in FIG. 3 to FIG. 5, it is possible to set the three-dimensional polygon model 20 in the virtual three-dimensional space and to color the three-dimensional polygon model 20. That is, it is possible based on the data shown in FIG. 3 to specify the position and color of each vertex 22, it is possible based on the data shown in FIG. 3 and FIG. 4 to specify the positions of the start point and the end point of the edge 23 and the color of the edge, and it is possible based on the data shown in FIG. 3 and FIG. 5 to specify the positions of the first to third vertices 22 of the triangle polygon 21 and the color of the triangle polygon 21. Note that the color information of each vertex 22, each edge 23 and each triangle polygon 21 may be represented in any color space (e.g., an RGB color space, a CMY color space, an HSV color space or an HLS color space). When the color information of each vertex 22, each edge 23 and each triangle polygon 21 is represented in an RGB color space, the color information includes red (R), green (G) and blue (B) level values.

As shown in FIG. 1, in this preferred embodiment, the program 29 executable by the processor 11 is stored in the storage 14. The program. 29 instructs the processor 11 to perform a process of generating color cross-section image data of raster format from the three-dimensional polygon model 20. Note that the program 29 may be stored in the ROM of the processor 11.

Figure 6:
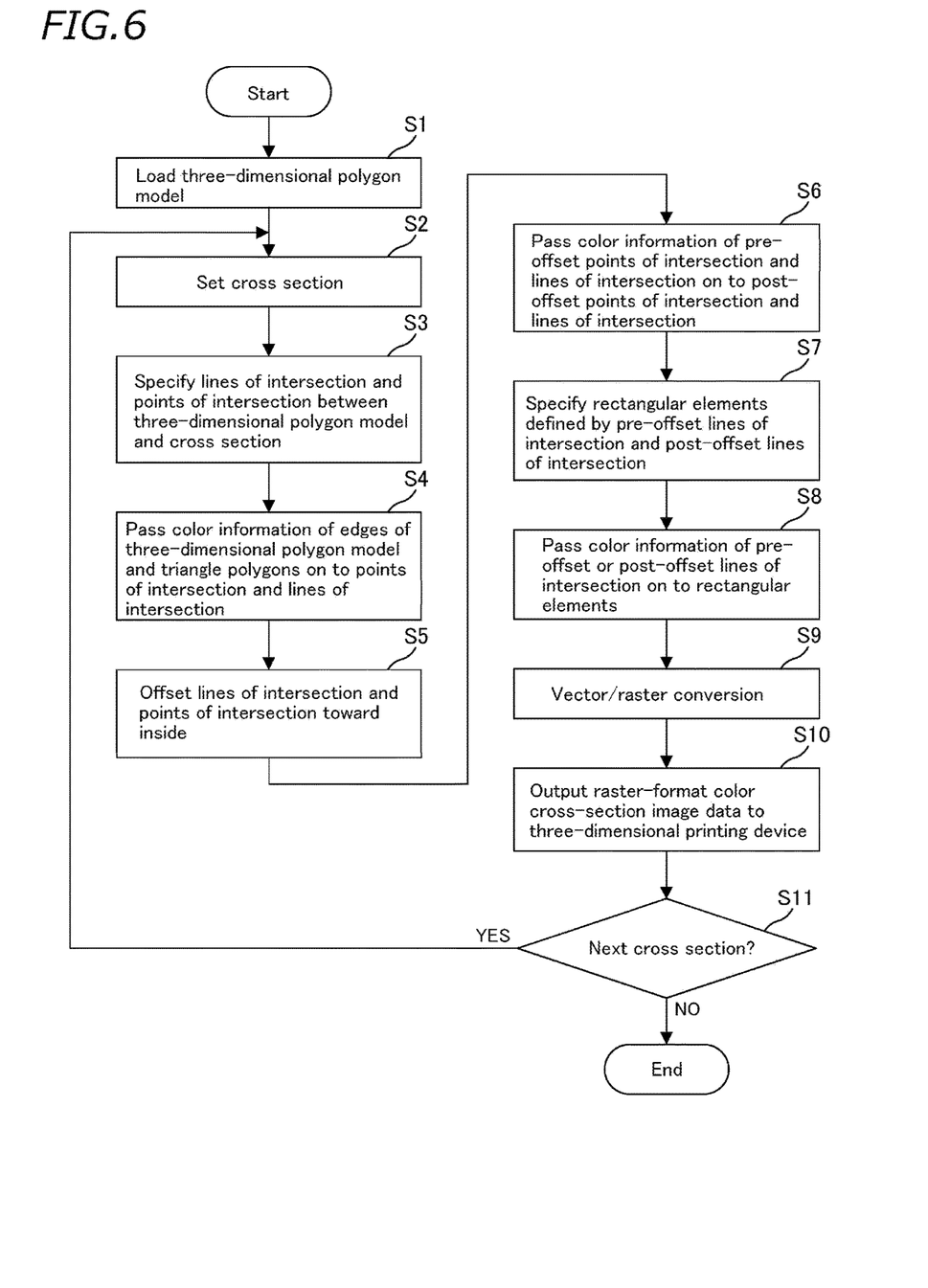
FIG. 6 is a flow chart showing the flow of a process of a processor.

Referring to the flowchart shown in FIG. 6, the process, which the program 29 instructs the processor 11 to execute, will be described in detail.

First, the processor 11 loads the three-dimensional polygon model 20 stored in the storage 14, and sets the three-dimensional polygon model 20 in the virtual three-dimensional space (step S1).

Figure 7:
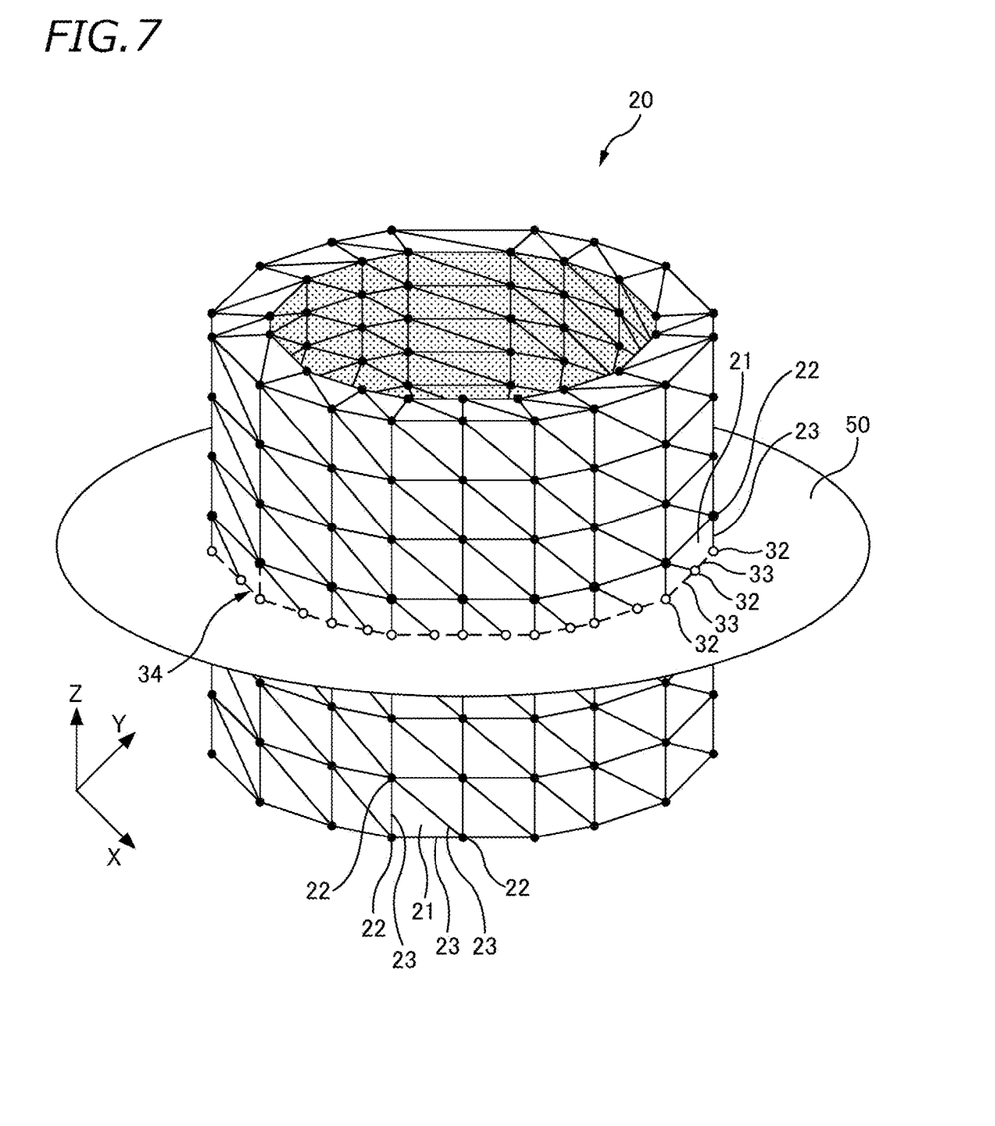
FIG. 7 is a view showing a three-dimensional polygon model, which is set in a virtual three-dimensional space, and a cross section thereof.

Next, as shown in FIG. 7, the processor 11 sets a cross section (plane) 31 in the virtual three-dimensional space (step S2). Specifically, the processor 11 sets the Z coordinate value of the cross section 50, thus setting the cross section 50 which is orthogonal to the Z axis in the virtual three-dimensional space.

Next, as shown in FIG. 7, the processor 11 finds an edge 23 and a triangle polygon 21 that intersect the cross section 50, from among the edges 23 and the triangle polygons 21 of the three-dimensional polygon model 20, so as to specify a point of intersection 32 between the edge 23 and the cross section 50 found by calculating the X coordinate and the Y coordinate of the point of intersection 32, and to specify a line of intersection 33 (the line of intersection 33 is defined by the two points of intersection 32 at the opposite ends thereof) between the triangle polygon 21 found and the cross section 50 (step S3).

Figure 8:
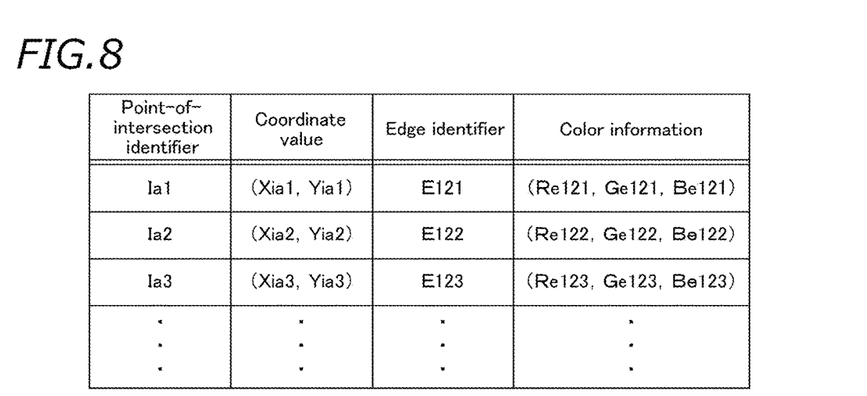
FIG. 8 is a view showing a data structure of points of intersection between edges and a cross section of the three-dimensional polygon model.
Figure 9:
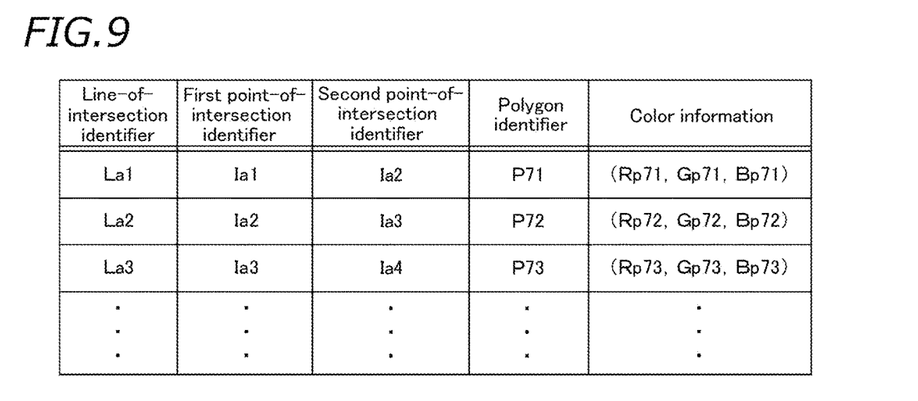
FIG. 9 is a view showing a data structure of lines of intersection between triangle polygons and a cross section of the three-dimensional polygon model.

In this process, as shown in FIG. 8, the processor 11 specifies the point of intersection 32 by associating the X coordinate and the Y coordinate of the point of intersection 32 with a unique identifier to identify the point of intersection 32 (hereinafter referred to as a point-of-intersection identifier). Moreover, as shown in FIG. 9, the processor 11 specifies the line of intersection 33 by associating point-of-intersection identifiers of the points of intersection 32 at the opposite ends of the line of intersection 33 with a unique identifier to identify the line of intersection 33 (hereinafter referred to as a line-of-intersection identifier). The combination of the points of intersection 32 and the lines of intersection 33 specified as previously described is a vector format representation of the shape of the outline 34 of the three-dimensional polygon model 20 at the cross section 50 (see FIG. 7). Therefore, the process in step S3 of specifying these points of intersection 32 and lines of intersection 33 corresponds to the process of obtaining the shape of the outline 34 of the three-dimensional polygon model 20 at the cross section 50. That is, the process of obtaining the cross-sectional shape of the outline 34 of the three-dimensional polygon model 20 corresponds to the process performed by the example shape obtaining processor described above.

Next, as shown in FIG. 8, the processor 11 associates the edge identifier of the edge 23 passing through the point of intersection 32 with the point-of-intersection identifier of the point of intersection 32, thus specifying the correspondence between the point of intersection 32 and the edge 23. Thus, the processor 11 loads the color information of the edge 23 by reference to the data shown in FIG. 4, and then passes the color information of the edge 23 on to the line of intersection 33 by associating the color information of the edge 23 with the point-of-intersection identifier of the point of intersection 32 (step S4; see FIG. 8).

As shown in FIG. 9, the processor 11 associates the polygon identifier of the triangle polygon 21 passing through the line of intersection 33 with the line-of-intersection identifier of the line of intersection 33, thus specifying the correspondence between the line of intersection 33 and the triangle polygon 21. Thus, the processor 11 loads the color information of the triangle polygon 21 by reference to the data shown in FIG. 5, and then passes the color information of the triangle polygon 21 on to the line of intersection 33 by associating the color information of the triangle polygon 21 with the line-of-intersection identifier of the line of intersection 33 (step S4; see FIG. 9). Herein, the color information of the triangle polygon 21 is recorded as the color information of the line of intersection 33. That is, the process of passing on the color information corresponds to the example process performed by the color information passing processor as described above.

The combination of the points of intersection 32 and the lines of intersection 33, to both of which the color information has been passed on, is a vector format representation of the shape and color of the outline 34 of the three-dimensional polygon model 20 at the cross section 50. Therefore, the process in step S4 of passing on the color information to the points of intersection 32 and to the lines of intersection 33 corresponds to the process of obtaining the color information of the outline 34 of the three-dimensional polygon model 20 at the cross section 50. That is, the process of obtaining the color information of the points of intersection 32 and the lines of intersection 33 of the outline 34 corresponds to the example process performed by the color information obtaining processor as described above.

Figure 10:
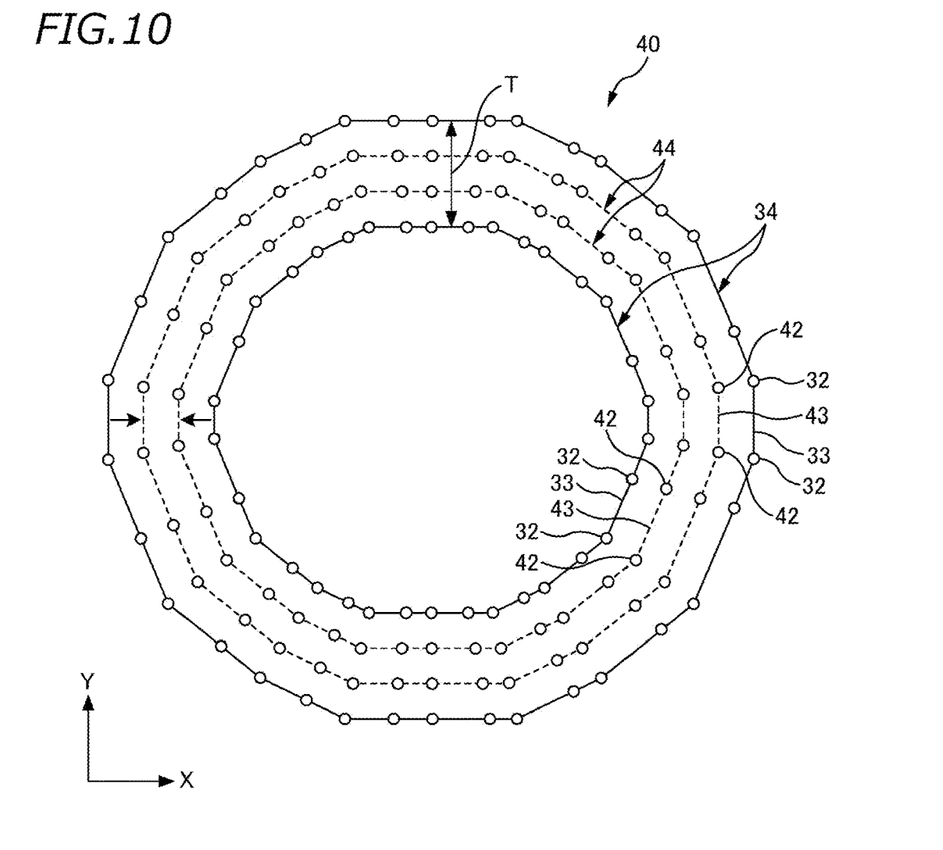
FIG. 10 is a view illustrating how to offset an outline of a three-dimensional polygon model along a cross section thereof.

Next, as shown in FIG. 10, the processor 11 offsets the outline 34 (shown by a solid line in FIG. 10) of the three-dimensional polygon model 20 generated in step S3 in the normal direction toward the inside of the three-dimensional polygon model 20 along the cross section 50 by a predetermined distance (step S5). That is, the processor 11 offsets (shifts) the points of intersection 32 specified in step S3 in the normal direction toward the inside of the three-dimensional polygon model 20 along the cross section 50 by a predetermined distance, thus determining the X coordinate and the Y coordinate of a post-offset point of intersection 42. Herein, if the three-dimensional printing device 1 is of a powder binding method, it is preferred that the offset distance is greater than or equal to the inverse of the printing resolution (dpi) of the three-dimensional printing device 1 and is less than or equal to the thickness T of the hollow space of the three-dimensional polygon model 20 (see FIG. 10). If the three-dimensional printing device 1 is of a fused deposition modeling method, it is preferred that, in addition to the aforementioned conditions, the offset distance is an integer multiple of the filament radius of the three-dimensional printing device 1. The process of offsetting the outline 34 of the three-dimensional polygon model 20 can use techniques described in Japanese Patent No. 3380429, Japanese Patent No. 3520200 and Japanese Laid-Open Patent Publication No. 2015-24631. Note that a round joint or a meiter joint, which are well known in the art, may be used to rectify the gap derived by offsetting a protruding portion.

Figure 11:
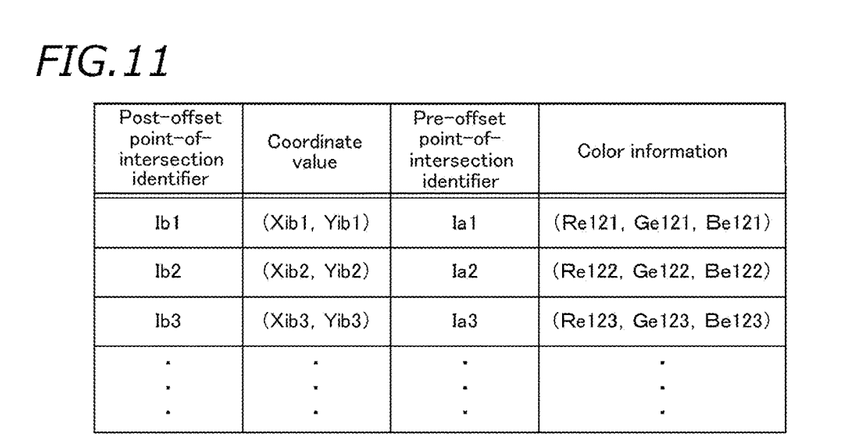
FIG. 11 is a view showing a data structure of points of intersection of a post-offset outline.

In the offsetting operation, as shown in FIG. 11, the processor 11 associates the X coordinate and the Y coordinate of the post-offset point of intersection 42 with a unique identifier to identify the post-offset point of intersection 42, thus specifying the post-offset point of intersection 42. The identifier of the post-offset point of intersection 42 may be, as necessary, referred to as the "post-offset point-of-intersection identifier". The identifier of the pre-offset point of intersection 32 may be, as necessary, referred to as the "pre-offset point-of-intersection identifier".

Figure 12:
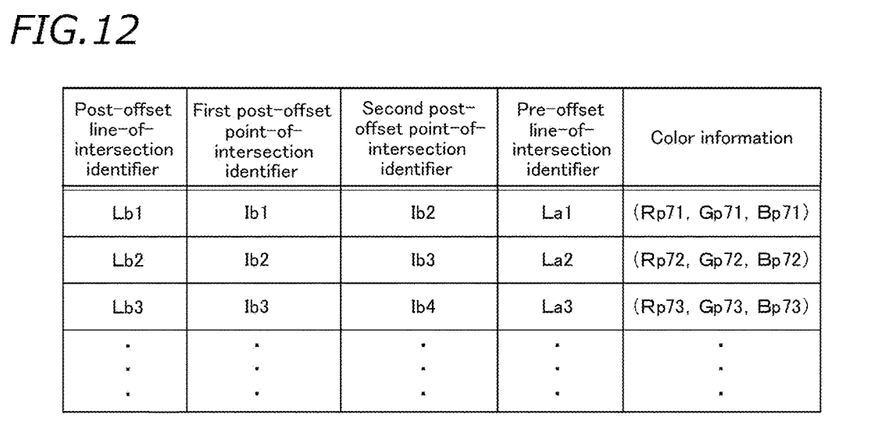
FIG. 12 is a view showing a data structure of lines of intersection of a post-offset outline.

Moreover, as shown in FIG. 12, the processor 11 associates the post-offset point-of-intersection identifier of the points of intersection 42 at the opposite ends of a post-offset line of intersection 43 with a unique identifier to identify the post-offset line of intersection 43, thus specifying the post-offset line of intersection 43. The identifier of the post-offset line of intersection 43 may be, as necessary, referred to as the "post-offset line-of-intersection identifier". The identifier of the pre-offset line of intersection 33 may be, as necessary, referred to as the "pre-offset line-of-intersection identifier".

As described above, the combination of the post-offset points of intersection 42 and the post-offset lines of intersection 43 is a vector format representation of the shape of an outline 44 (shown by a broken line in FIG. 10) obtained by offsetting the outline 34 (see FIG. 10) of the three-dimensional polygon model 20 at the cross section 50. Therefore, the process in step S5 of obtaining the post-offset point of intersection 42 and the post-offset line of intersection 43 by offsetting the point of intersection 32 and the line of intersection 33 corresponds to the process of obtaining the shape of the post-offset outline 44 by offsetting the shape of the outline 34 of the three-dimensional polygon model 20 at the cross section 50. Herein, the process of offsetting the shape of the outline 34, which is obtained by the shape obtaining processor, toward the inside of the three-dimensional polygon model 20 corresponds to the example process performed by the offsetting processor described above.

Next, as shown in FIG. 11, the processor 11 associates the post-offset point of intersection identifier and the pre-offset point of intersection identifier with each other, thus specifying the correspondence between the pre-offset point of intersection 32 and the post-offset point of intersection 42. Thus, the processor 11 loads the color information of the pre-offset point of intersection 32 by reference to the data of the pre-offset point of intersection 32 shown in FIG. 8, and then passes the color information of the pre-offset point of intersection 32 on to the post-offset point of intersection 42 by associating the color information with the post-offset point of intersection identifier (step S6; see FIG. 11).

Moreover, as shown in FIG. 12, the processor 11 associates the post-offset line-of-intersection identifier and the pre-offset line-of-intersection identifier with each other, thus specifying the correspondence between the pre-offset line of intersection 33 and the post-offset line of intersection 43. Thus, the processor 11 loads the color information of the pre-offset line of intersection 33 by reference to the data of the pre-offset line of intersection 33 shown in FIG. 9, and then passes the color information of the pre-offset line of intersection 33 on to the post-offset line of intersection 43 by associating the color information with the post-offset line-of-intersection identifier (step S6; see FIG. 12). The process of passing the color information of the points of intersection 32 and the lines of intersection 33 of the pre-offset outline 34 to the points of intersection 42 and the lines of intersection 43 of the post-offset outline 44 as described above corresponds to the example process performed by the color information passing processor as described above. Thus, the color information of the points of intersection 42 and the lines of intersection 43 of the post-offset outline 44 is stored based on the color information, which is obtained in the process of obtaining the color information of the points of intersection 32 and the lines of intersection 33 of the pre-offset outline 34.

As described above, the combination of the post-offset points of intersection 42 and the post-offset lines of intersection 43, to which the color information has been passed on, is a vector format representation of the shape and color of the post-offset outline 44 (see FIG. 10). Therefore, the process in step S6 of passing on the color information to the points of intersection 42 and the lines of intersection 43 corresponds to an example process of passing the color information of the outline 34 of the three-dimensional polygon model 20 at the cross section 50 to the post-offset outline 44. Note that since the color information of a pre-offset line of intersection 33 corresponds to the color information of a triangle polygon 21 that passes through the line of intersection 33, the color information of a post-offset line of intersection 43 also corresponds to the color information of the triangle polygon 21.

Figure 13:
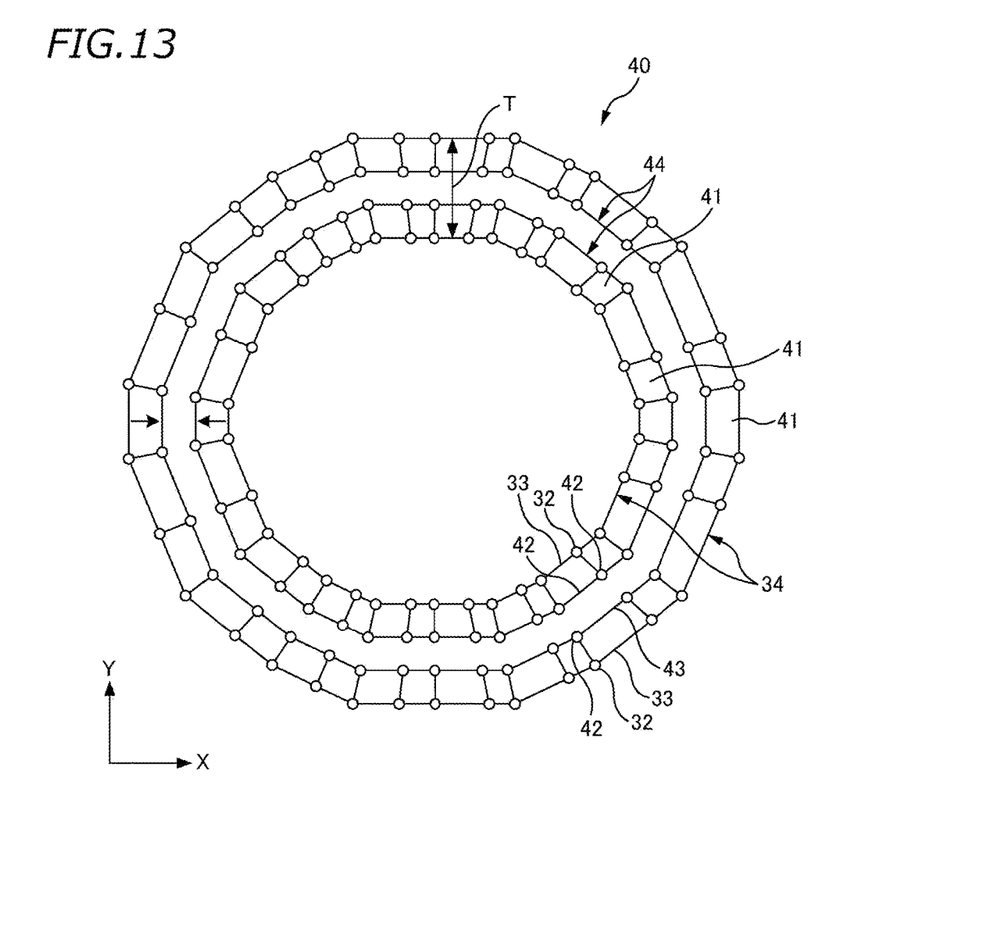
FIG. 13 is a view showing a slice model generated from a pre-offset outline and a post-offset outline.
Figure 14:
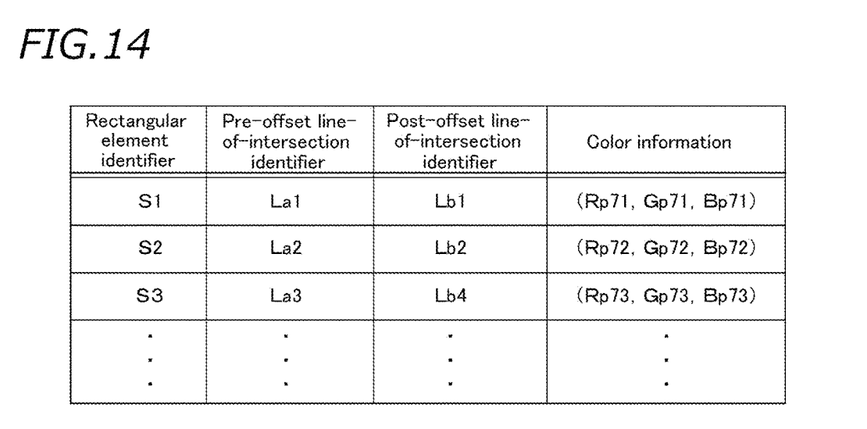
FIG. 14 is a view showing a data structure of rectangular elements of a slice model.
Figure 15:
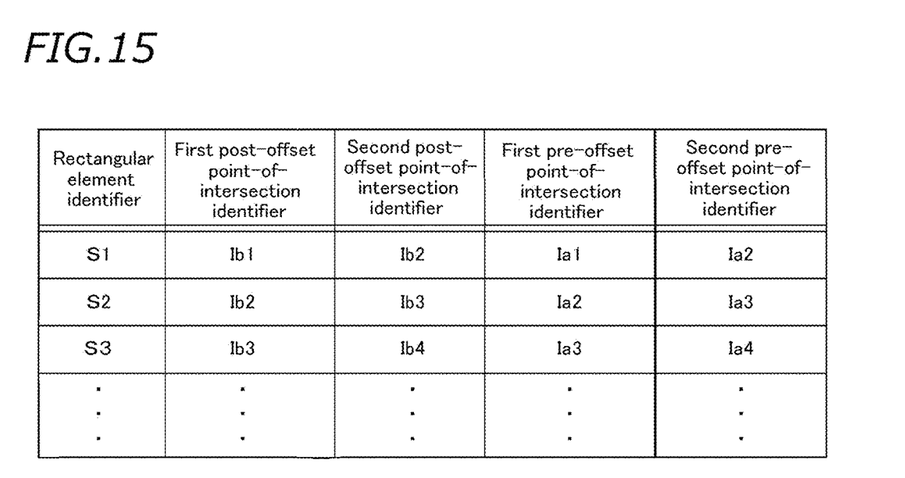
FIG. 15 is a view showing a data structure of rectangular elements of a slice model.

Next, as shown in FIG. 13, the processor 11 generates rectangular elements 41 so that the rectangular elements 41 are arranged in a row along the outlines 34 and 44 between the outline 34 of the three-dimensional polygon model 20 generated in step S3 and the outline 44 derived by offsetting in step S5 (step S7). That is, the processor 11 associates the pre-offset line-of-intersection identifier and the post-offset line-of-intersection identifier with a unique identifier to identify the rectangular element 41 (hereinafter referred to as a rectangular element identifier), as shown in FIG. 14, thus specifying the rectangular element 41 defined by the points of intersection 32 at the opposite ends of the pre-offset line of intersection 33 and the points of intersection 42 at the opposite ends of the post-offset line of intersection 43. A slice model 40 including these rectangular elements 41 is a vector format representation of a shape that is obtained by thickening and meshing (with a collection of rectangular elements 41) the outline 34 of the three-dimensional polygon model 20 at the cross section 50. Note that the rectangular element 41 may be specified by using a rectangular element identifier associated with identifiers of the points of intersection 32 at the opposite ends of the pre-offset line of intersection 33 and identifiers of the points of intersection 42 at the opposite ends of the post-offset line of intersection 43, as shown in FIG. 15. The process of obtaining the slice model 40 by meshing, with the rectangular elements 41, the gap between the shape of the pre-offset outline 34 obtained by the shape obtaining processor and the shape of the post-offset outline 44 obtained by the offsetting processor corresponds to the example process performed by the slice model generating processor as described above.

Next, the processor 11 refers to the data of the pre-offset line of intersection 33 shown in FIG. 9, and loads the color information of the pre-offset line of intersection 33. The processor 11 also associates the color information of the line of intersection 33 with the rectangular element identifier of the rectangular element 41 generated in step S7, thus passing the color information of the pre-offset line of intersection 33 on to the rectangular element 41 (step S8; see FIG. 14). The combination of the rectangular elements 41, to which the color information has been passed on as described above, is a vector format representation of the shape and color of the slice model 40 obtained by thickening and meshing the outline 34 of the three-dimensional polygon model 20 at the cross section 50. Herein, since the color information of a pre-offset line of intersection 33 corresponds to the color information of a triangle polygon 21 that passes through the line of intersection 33, the color information of a rectangular element 41 also corresponds to the color information of the triangle polygon 21.

Note that in step S8, the color information of the post-offset line of intersection 43 may be passed on to the rectangular element 41 by loading the color information of the post-offset line of intersection 43 by reference to the data of the post-offset line of intersection 43 shown in FIG. 12, and associating the color information of the line of intersection 43 with the rectangular element identifier of the rectangular element 41 generated in step S7. The process of passing the color information on to a slice model generated by the slice model generating processor corresponds to the example process performed by the color information passing processor as described above.

Next, the processor 11 executes the vector-raster conversion process (step S9). Specifically, this is done in accordance with one of (A) to (B) below. Note that in the case of (A) below, it is preferred to transition from step S4 to step S9 without executing the process of step S5 to step S8 described above (see FIG. 6). In the case of (B) below, it is preferred to transition from step S6 to step S9 without executing the process of step S7 and step S8 as described above.

(A) The processor 11 refers to the data shown in FIG. 8 and FIG. 9 to set a combination of the pre-offset points of intersection 32 and the pre-offset lines of intersection 33, to which the color information has been passed on (a vector format model of the outline 34 of the three-dimensional polygon model 20 at the cross section 50), on the XY plane, and converts the combination to color cross-section image data of raster format (step S9). Herein, color cross-section image data that represents the shape and color information of the pre-offset outline 34 is obtained. As necessary, the processor 11 performs a color correction on the color cross-section image data or converts the color space thereof.

(B) The processor 11 refers to the data shown in FIG. 11 and FIG. 12 to set a combination of the post-offset points of intersection 42 and the post-offset lines of intersection 43, to which the color information has been passed on (a vector format model of the post-offset outline 44), on the XY plane, and converts the combination to color cross-section image data of raster format (step S9). Herein, color cross-section image data that represents the shape and color information of the post-offset outline 44 is obtained. As necessary, the processor 11 performs a color correction on the color cross-section image data or converts the color space thereof. Note that if the three-dimensional printing device 1 applies a fused deposition modeling method, (B) is preferably used.

(C) The processor 11 refers to the data shown in FIG. 8, FIG. 9, FIG. 11, FIG. 12 and FIG. 14 to set a collection of rectangular elements 41 (slice model 40), to which the color information has been passed on, on the XY plane, and converts the collection to color cross-section image data of raster format (step S9). Herein, color cross-section image data that represents the shape and color information of the slice model 40 is obtained. As necessary, the processor 11 performs a color correction on the color cross-section image data or converts the color space thereof. Note that if the three-dimensional printing device 1 applies a powder binding method, (C) is preferably used.

After generating color cross-section image data of raster format in accordance with any of the cases (A) to (C) above, the processor 11 outputs the color cross-section image data to the three-dimensional printing device 1 from the output 15 (step 10). The three-dimensional printing device 1 adds predetermined thickness information to the color cross-section image data received from the cross-section data generating device 10, thus generating slice object data including thickness information. Then, the three-dimensional printing device 1 produces (prints) a slice object having a thickness that is equal to the value of the thickness information in accordance with the slice object data (the slice object is colored in accordance with the color cross-section image data). Herein, the process of generating each color cross-section image data corresponds to an example process performed by the image generating processor. The process of outputting each color cross-section image data corresponds to an example process performed by the output as described above.

Thereafter, the process from step S2 to step S10 is preferably performed on the three-dimensional polygon model 20 loaded in step S1 layer by layer in the Z-axis direction. For example, the processor 11 repeatedly executes the process of steps S2 to S10 (YES in step S11). Then, pieces of color cross-section image data are generated successively. The pieces of color cross-section image data are successively transferred from the processor 11 to the three-dimensional printing device 1. Based on the transferred color cross-section image data, slice objects are printed and stacked on one another by the three-dimensional printing device 1. Thus, a three-dimensional printed object, which includes slice objects stacked together, is printed. Note that the difference value between the Z coordinate value of the cross section 50 that is set in one iteration of step S2 and the Z coordinate value of the cross section 50 that is set in the next iteration of step S2 is equal to the value of the thickness information to be added by the three-dimensional printing device 1. The value of the thickness information corresponds to the thickness of a single layer of the slice object printed by the three-dimensional printing device 1.

Then, the process of the processor 11 ends when the process of steps S2 to S10 has been completed for the entire height in the Z direction of the three-dimensional polygon model 20 loaded in step S1 (NO in step S11). The final iteration of the process of steps S2 to S10 generates slice object data including the color cross-section image data and the thickness information. Then, when the uppermost layer of the slice object is produced by the three-dimensional printing device 1 based on the generated slice object data, a three-dimensional printed object is completed.

The preferred embodiment described above provides the following effects.

(1) Color cross-section image data of raster format is generated from one three-dimensional polygon model 20 for each layer. Therefore, there is no need to prepare a plurality of single-color color images of raster format for each layer in advance, and there is no need to prepare a three-dimensional model for each primary color in advance.

(2) The three-dimensional polygon model 20 includes triangle polygons 21, vertices 22 and edges 23, each of which is associated with color information. The amount of data of the three-dimensional polygon model 20 is less than the total amount of data of the pieces of color cross-section image data of raster format for different layers. Thus, it is possible to significantly reduce or minimize the data capacity of the storage 14 to be provided for the three-dimensional polygon model 20.

(3) Each time a piece of color cross-section image data is transferred from the cross-section data generating device 10 to the three-dimensional printing device 1, the three-dimensional printing device 1 generates a colored slice object in accordance with the color cross-section image data. Such slice objects are stacked together, thus printing a colored three-dimensional printed object. Each slice object is produced in a colored state. Therefore, even in a portion where the surface of the three-dimensional printed object is steeply inclined with respect to the direction of deposition, it is possible to normally color such a portion.

(4) Color cross-section image data obtained by rasterizing the slice model 40, which is a collection of rectangular elements 41, is output to the three-dimensional printing device 1. Then, one layer of the slice object and the next layer of the slice object, which are produced by the three-dimensional printing device 1, are desirably combined together. Particularly, even when the printing resolution (dpi) of the three-dimensional printing device 1 is high as in a powder binding method, adjacent layers of the slice object are desirably combined together.

While an example of the cross-section data generating device proposed herein has been described above, the above preferred embodiment is not intended to limit the present invention. Cross-section data generating devices according to preferred embodiments of the present invention may be altered or modified without departing from the true sprit thereof, and the cross-section data generating device proposed herein and various components thereof include their equivalents. Possible variations to the above preferred embodiment will be described below. The following variations may be used in combination with one another as long as such combinations are viable.

(1) In the above preferred embodiment, the processor 11 outputs the color cross-section image data of raster format to the three-dimensional printing device 1 from the output 15 (step S10). The color cross-section image data may be further recorded in the storage 14. Alternatively, the processor 11 may execute a display control process of displaying an image of the color cross-section image data on the display 13.

(2) In the above preferred embodiment, the cross section 50 is orthogonal to the Z axis. It may be orthogonal to the X axis or the Y axis. When the cross section 50 is orthogonal to the X axis, the position of the point of intersection 32 between the edge 23 and the cross section 50 is represented by the Y coordinate and the Z coordinate. When the cross section 50 is orthogonal to the Y axis, the position of the point of intersection 32 between the edge 23 and the cross section 50 is represented by the X coordinate and the Z coordinate.

(3) In the above preferred embodiment, the color cross-section image data is output from the cross-section data generating device 10 to the three-dimensional printing device 1 (step S10), and the thickness information is added to the color cross-section image data by the three-dimensional printing device 1. The thickness information may be added by the cross-section data generating device 10. For example, after step S9 and before step S10, the processor 11 may produce a slice object data by adding the thickness information to the color cross-section image data. Then, in the output process of step S10, the processor 11 may output slice object data, which includes the thickness information and the color cross-section image data, to the three-dimensional printing device 1 from the output 15.

(4) In the above preferred embodiment, the difference value between the Z coordinate value of the cross section 50 that is set in one iteration of step S2 and the Z coordinate value of the cross section 50 that is set in the next iteration of step S2 is equal to the value of the thickness information to be added by the three-dimensional printing device 1. These values may differ from each other. This also applies to a case in which the thickness information is added by the cross-section data generating device 10, as in the variation (3) above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cross-section data generating device comprising:
   a storage that stores a three-dimensional polygon model including color information;
   a shape obtaining processor configured or programmed to obtain a shape of an outline of the three-dimensional polygon model at a cross section, which is a plane that intersects the three-dimensional polygon model; and
   a color information obtaining processor configured or programmed to obtain color information of the outline at the cross section, wherein
   the color information of the outline includes color information of points and lines of the shape; and
   the shape of the outline includes points of intersection between the cross section and the three-dimensional polygon model and lines of intersection between the cross section and the three-dimensional polygon model.

2. The cross-section data generating device according to claim 1, wherein:

the storage stores therein the three-dimensional polygon model such that each edge and each polygon of the three-dimensional polygon model are associated with the color information;

the shape obtaining processor specifies at least one of the points of intersection between the cross section and each of the edges of the three-dimensional polygon model that intersects the cross section, and specifies at least one of the lines of intersection between the cross section and each of the polygons of the three-dimensional polygon model that intersects the cross section, thus obtaining the shape of the outline; and the color information obtaining processor passes color information of each edge that intersects at the at least one of the points of intersection on to the at least one of the points of intersection, and passes color information of each polygon that intersects the at least one of the lines of intersection on to the at least one of the lines of intersection, thus obtaining color information of the outline.

3. The cross-section data generating device according to claim 1, further comprising an image generating processor configured or programmed to generate, in accordance with the shape obtained by the shape obtaining processor and the color information obtained by the color information obtaining processor, color cross-section image data, which is image data of the outline that is represented by the shape and the color information.

4. The cross section data generating device according to claim 3, wherein the image generating processor generates the color cross-section image data of the slice model in raster format.

5. The cross-section data generating device according to claim 3, further comprising an output that outputs the color cross-section image data generated by the image generating processor to a three-dimensional printing device.

6. The cross-section data generating device according to claim 5, wherein the output outputs, to the three-dimensional printing device, predetermined thickness information together with the color cross-section image data generated by the image generating processor.

7. The cross-section data generating device according to claim 1, further comprising:
an offsetting processor configured or programmed to offset the shape obtained by the shape obtaining processor toward the inside of the three-dimensional polygon model; and
a color information passing processor configured or programmed to pass the color information obtained by the color information obtaining processor on to the offset shape which is derived by the offsetting processor.

8. The cross-section data generating device according to claim 7, further comprising an image generating processor configured or programmed to generate, in accordance with the offset shape which is derived by the offsetting processor and the color information which has been passed on by the color information passing processor, color cross-section image data which is image data of a post-offset outline represented by the shape and the color information.

9. The cross section data generating device according to claim 8, wherein the image generating processor generates the color cross-section image data of the slice model in raster format.

10. The cross-section data generating device according to claim 8, further comprising an output that outputs the color cross-section image data generated by the image generating processor to a three-dimensional printing device.

11. The cross-section data generating device according to claim 10, wherein the output outputs, to the three-dimensional printing device, predetermined thickness information together with the color cross-section image data generated by the image generating processor.

12. The cross-section data generating device according to claim 1, further comprising:
an offsetting processor configured or programmed to offset the shape obtained by the shape obtaining processor toward the inside of the three-dimensional polygon model;
a slice model generating processor configured or programmed to generate a slice model by meshing a gap between the shape obtained by the shape obtaining processor and the offset shape which is derived by the offsetting processor; and
a color information passing processor configured or programmed to pass the color information obtained by the color information obtaining processor on to the slice model generated by the slice model generating processor.

13. The cross-section data generating device according to claim 12, further comprising an image generating processor configured or programmed to generate, in accordance with the slice model generated by the slice model generating processor and the color information passed on by the color information passing processor, color cross-section image data which is image data of the slice model including the color information.

14. The cross section data generating device according to claim 13, wherein the image generating processor generates the color cross-section image data of the slice model in raster format.

15. The cross-section data generating device according to claim 13, further comprising an output that outputs the color cross-section image data generated by the image generating processor to a three-dimensional printing device.

16. The cross-section data generating device according to claim 15, wherein the output outputs, to the three-dimensional printing device, predetermined thickness information together with the color cross-section image data generated by the image generating processor.

17. A cross-section data generating method comprising:
a shape obtaining step of obtaining a shape of an outline of a three-dimensional polygon model, provided with color information and stored in a storage, at a cross section, which is a plane that intersects the three-dimensional polygon model; and
a color information obtaining step of obtaining color information of the outline at the cross section, wherein
the color information of the outline includes color information of points and lines of the shape; and
the shape of the outline includes points of intersection between the cross section and the three-dimensional polygon model and lines of intersection between the cross section and the three-dimensional polygon model.

18. A non-transitory computer readable medium storing a program executable by a computer capable of reading a storage storing therein a three-dimensional polygon model provided with color information to execute a method comprising:
a shape obtaining process of obtaining a shape of an outline of the three-dimensional polygon model at a cross section, which is a plane that intersects the three-dimensional polygon model; and
a color information obtaining process of obtaining color information of the outline at the cross section, wherein the color information of the outline includes color information of points and lines of the shape; and the shape of the outline includes points of intersection between the cross section and the three-dimensional polygon model and lines of intersection between the cross section and the three-dimensional polygon model.

\* \* \* \* \*